United States Patent Office 3,055,944
Patented Sept. 25, 1962

3,055,944
PRODUCTION OF METAL ORGANOBORON COMPOUNDS
Julian B. Honeycutt, Jr., Baton Rouge, La., assignor to Ethyl Corporation, New York, N.Y., a corporation of Delaware
No Drawing. Filed Dec. 29, 1958, Ser. No. 783,072
4 Claims. (Cl. 260—606.5)

The present invention is concerned with the production of organoboron compounds, in particular complex metal organoboron compounds.

Organoboron compounds are fairly well known and of considerable utility. However, such compounds which are complexed with another metal, that is metal organoboron compounds similar to sodium triethylborohydride, have been little explored. Such compounds are also of considerable utility and have advantage over the more simple organoboron compounds such as triethylboron because of their greater stability and ease of handling.

It has been reported in the literature that sodium triethylborohydride can be prepared by reacting sodium hydride with triethylborane. However, the procedure suffers certain inherent disadvantage such that the process has not been employed on a commercial scale, is hazardous and impractical. The reaction of sodium hydride with triethylborane proceeds very rapidly and violently even at room temperature. Further, it is reported in the literature that lithium hydride will not react with triethylborane as readily or under the same conditions as does sodium hydride. The lithium hydride reaction requires using ether as a diluene and specific temperatures are reported to be employed which are considerably higher than room temperature.

Accordingly, an object of this invention is to provide a novel process for the manufacture of metal organoboron compounds. Another object is to provide an improved process for the preparation of alkali or alkaline earth organoboron hydride compounds. A specific object is to provide a more efficient and practical method for the preparation of sodium triethylborohydride. These and other objects will be apparent as the discussion proceeds.

The above and other objects of this invention are accomplished by reacting a hydride of an alkali metal having an atomic weight greater than 22 or an alkaline earth metal with an organoboron compound at a temperature above about 50° C. in the presence of a hydrocarbon. It has been found that when conducting the reaction at a temperature above about 50° C. and in the presence of a hydrocarbon, a fast but smooth, self-controlled, and safe reaction is obtained with high yields of the desired product. The alkali metal hydrides of metals having the designated atomic weight, particularly sodium hydride, are preferred along with the fully alkylated boron compounds, especially triethylborane, and the saturated aliphatic or aromatic hydrocarbons. Likewise for best results the temperature is preferably between about 60 to 150° C. A particularly preferred embodiment of this invention comprises the reaction of sodium hydride with triethylborane in the presence of a saturated aliphatic hydrocarbon medium, especially the hexanes, or an aromatic hydrocarbon, especially benzene and lower alkyl derivatives thereof at a temperature between about 60 to 150° C.

The process is of particular advantage in that a smooth, self-controlled reaction takes place between the metal hydride and the organoboron compound thus overcoming the disadvantages of the prior art reaction. Further, the reaction proceeds quite rapidly and results in a high yield of the desired product without undesirable side reactions. Other advantages will be evident as the discussion proceeds.

The metal hydride employed is a hydride of the alkali metals having an atomic weight above 22 or alkaline earth metals, that is the metals of groups I-A, having the designated atomic weight, and II-A of the periodic chart of the elements. Such hydrides include for example, sodium hydride, potassium hydride, beryllium hydride, magnesium hydride, calcium hydride, and strontium hydride. The hydrides are prepared by conventional techniques as for example the direct reaction of the metal, preferably in finely divided form, with hydrogen. Sodium hydride is especially preferred because of its greater availability, reactivity and economy.

The organoboron compounds employed are, in general, any such compounds having at least one boron to carbon linkage. They are preferably liquid or soluble in the reaction system. They can be either aliphatic, alicyclic, preferably saturated, or aromatic organoboron compounds having at least one carbon to boron linkage with the remaining valences of the boron being satisfied by similar such linkages or other functional groups which are essentially inert in the principal reaction. Typical examples of such organoboron compounds include, for example, trimethylborane, triethylborane, trihexylborane, trioctylborane, tricyclopentylborane, tricyclohexylborane, trimethylcyclohexylborane, diethylboron bromide, triethylborane-trimethylamine, trioctylborane-triethylamine, trioctadecylborane, triphenylborane, tribenzylborane, diphenyl boron chloride, naphthyl boron dichloride and the like. Thus, the aforementioned compounds illustrate preferred organoboron compounds wherein the organo groups are alkyl, cycloalkyl, and aryl radicals. In general, the hydrocarbon groups will contain up to about 20 carbon atoms and can be further substituted provided such substituents are inert in the reaction. The trihydrocarbon boron compounds, particularly those in which the organo radicals are straight chain alkyl hydrocarbon radicals having up to about 10 carbon atoms are especially preferred because of their greater availability and applicability to the process. Mixtures of the aforementioned organoboron compounds can likewise be employed.

In general any saturated or aromatic hydrocarbon can be employed as a diluent in the process of this invention. Among the general criteria in choice of the hydrocarbon medium to be employed is that it be a liquid under the reaction conditions preferably essentially inert to the reactants and one which is of a boiling point susceptible to ready removal from the reaction system if desired. Among the hydrocarbons which can be employed are included the various alkanes, cyclanes, and aromatic compounds, including the mononuclear aromatic compounds, polynuclear non-fused ring and polynuclear fused ring aromatic compounds. Typical examples of the alkanes which are employed include heptane, octane, nonane, and the like, up to and including about octadecane and the like, and their various branched chain isomers. When cyclanes are employed as solvent media, included are, for example, cycloheptane, cyclooctane, methylcyclohexane, dimethylcyclohexane, isopropylcyclopentane, and the like. Similarly, various polycyclanes are employed as, for example, cyclopentylcyclopentane; (2-methylcyclopentyl)-cyclohexane; cyclohexylcyclohexane; decahydronaphthalene; decahydrofluorene; and the like. Typical examples of mononuclear aromatic compounds include toluene, ethylbenzene, the xylenes, 1,2-diethylbenzene, cyclopropylbenzene, the cymenes, and the like. When the diluents are polynuclear non-fused aromatic compounds, included are, for example, 1-methyl-2-phenyl benzene; 1,3-diphenylpropane; 1-phenyl-2-p-tolylethane; 1,1-diphenylheptane; and the like. Polynuclear fused ring aromatic compounds can be, for example, indane; 1-methylindane; tetralin; 1-methylnaphthalene; and the like. It is to be understood that such hydrocarbon media can be further substituted provided such substituents are essentially inert in the reaction mixture. In general, liquid saturated or aromatic hydrocarbons having up to about 20 carbon atoms are employed. It is preferabl to employ such hydrocarbons having up to about 20 carbon atoms which have a high boiling point, e.g. above about 50° C. In order to obtain a smooth reaction and eliminate refluxing or pressure operation, hydrocarbons having boiling points above the reaction temperature employed are particularly well suited. In an especially preferred embodiment the hexanes, octanes, nonanes, and decanes and the aromatic hydrocarbons, particularly benzene, toluene and xylene are employed because of their greater availability and resistivity to reaction in the system. It is to be understood that mixtures of the aforementioned hydrocarbons are also suitable, for example mineral oil, heavy alkylate, gasoline, diesel fuel and the like.

The proportions of the reactants and hydrocarbon employed are not necessarily critical but will effect the yield obtained. For example, some metal organoboron compound is obtained when only a minor amount of the alkali or alkaline earth metal is reacted with the organoboron compound or vice versa. In general, however, between about 0.8–1.5 parts of the alkali or alkaline earth metal hydride per part of the organoboron compound is used. It has been found that greater yields are obtained when employing an excess of between about 10 to 50 percent by weight of the organoboron compound over the metal hydride. The solvent is employed generally in amount sufficient to slurry the metal hydride when it is a solid under reaction conditions or to provide a fluid reaction system. For convenience then, the solvent is based upon the metal hydride employed and is generally between about 10 parts to 100 parts per part by weight of the metal hydride. Improved results are obtained when the solvent is between about 10 parts to 75 parts per part by weight of the metal hydride.

The temperature at which the reaction is conducted is important. It has been found that a temperature of at least 50° C. is required in order for the reaction to take place. In general, temperatures between about 50 to 200° C. can be used. However, in order to obtain best results it is preferable to conduct the reaction at between about 60 to 150° C. When operating within this range of temperatures fastest reaction rates are obtained and higher yields.

The process of this invention will be further understood from the examples which follow. Unless otherwise specified all parts are by weight.

*Example I*

To a reactor equipped within internal agitation, external heating and cooling means, a means for admitting and discharging reactants and products, and a reflux condenser was added 1.2 parts of finely divided sodium hydride and 16.5 parts of hexane. The mixture was brought to the reflux temperature by external heating then 7 parts of triethylborane were slowly added to the mixture to maintain a gentle reflux. At the completion of the addition period, the mixture was refluxed for 30 minutes and then the hexane was distilled off by reducing the pressure at 100° C. to 1 millimeter of mercury. A viscous colorless residue remained which analyzed 19.0 parts sodium with a sodium to hydrogen ratio of 1.09 whereas sodium triethylborohydride contains 18.5 parts of sodium with a sodium to hydrogen ratio of 1.00.

In contrast to the results obtained in the above example no reaction was obtained when triethylborane was added to the sodium hydride-hexane mixture until a temperature of about 50° C. was obtained. At this temperature the reaction was self-sustaining and exothermic so that no further heating was required.

*Example II*

Employing the procedure of Example I, 2.4 parts of sodium hydride dispersed in 20 parts of toluene are reacted with 12.5 parts of triethylborane at 100° C. for ½ hour. Sodium triethylborohydride is obtained in high yield and purity.

*Example III*

Example I is repeated with exception that mineral oil is substituted for hexane and the reaction temperature is maintained at 150° C. Sodium triethylborohydride is obtained in high yield.

*Example IV*

To the reactor of Example I is added 26.6 parts of triphenylborane dissolved in 500 parts of xylene. Then a slurry of 2.4 parts of sodium hydride in 20 parts of xylene is added to the reactor with the temperature maintained at 75° C. for 1 hour. Sodium triphenylborohydride is obtained in high yield.

*Example V*

The procedure of Example IV is repeated with exception that tricyclohexylboron and benzene are employed in place of the boron compound and solvent and the temperature is maintained at reflux for 2 hours. Sodium tricyclohexyl borohydride is obtained in high yield.

*Example VI*

Calcium bis-(trioctylborohydride) is obtained in high yield when 4.2 parts of finely divided calcium hydride are reacted with 80.0 parts of trioctylborane in 200 parts of mixed nonanes at 100° C. for 45 minutes.

*Example VII*

Example I is repeated with exception that diethylboron chloride is employed in place of triethylboron. Sodium diethylchloroborohydride is produced.

*Example VIII*

Potassium trimethylborohydride is obtained when the procedure of Example I is employed substituting potassium hydride for sodium hydride and trimethylborane for triethylborane and employing 150 parts of cyclohexane as the diluent.

*Example IX*

When reacting 2.6 parts of finely divided magnesium hydride with 24.5 parts of triethylboron in 50 parts of cyclohexane at the reflux temperature for 3 hours, magnesium bis(triethylborohydride) is obtained.

The above examples are presented by way of illustration and it is not intended to be limited thereby. It will be evident that other organoboron compounds, metal hydrides and hydrocarbons mentioned hereinbefore can be substituted to produce equally satisfactory results.

Although the above examples have demonstrated the preferable use of atmospheric pressure, it is to be understood that pressures below and above atmospheric can be employed. Likewise at temperatures above about 150° C. pressure can be used to advantage in those instances where the product is susceptible to degradation. In general, pressures between about atmospheric to 500 p.s.i. are employed when so required.

As demonstrated by the examples the reaction is essentially instantaneous once the initiating temperature is reached. Ordinarily, reaction times less than a period of about 5 hours are employed but generally times between about ¼ to 2 hours are preferred. Longer reaction times at temperatures above 100° C. are to be avoided since some degradation of the product may occur.

It is not necessary to isolate the metal organoboron hydride from the reaction mixture since it is employable as obtained. If it is desirable to isolate the product such can be done readily by evaporation of the hydrocarbon and excess organoboron reactant when employed. Likewise, the product can be purified to only contain the metal organoboron hydride in solution in the hydrocarbon by vacuum distilling any excess organoboron reactant. A solution of the product in the hydrocarbon is a very effective form for its employment. Since the product is highly reactive it should be kept in an inert atmosphere or blanketed by inert liquids.

The products of this invention are of considerable utility. For example, they can be used as a source of hydrogen by reaction with an alcohol or water. Thus the generation of hydrogen is readily attained by slowly adding water to sodium triethylborohydride. The products are also suitable for use as selective reducing agents. A still further use of the products is their olefination to obtain additional carbon to boron linkages in the product. For example, sodium triethylborohydride can be reacted with ethylene to produce sodium tetraethylboron. Likewise mixed alkyl products can be obtained by reacting, for example, sodium triethylborohydride with 1-hexene to obtain sodium triethylhexylboron. Other uses of the products produced according to the process will be evident.

Having thus described the process of this invention it is not intended that it be limited except as set forth in the following claims.

I claim:

1. The process for producing a metal hydrocarbon boron hydride which comprises reacting a hydride of a metal selected from the group consisting of alkali metals having an atomic weight above 22 and alkaline earth metals with a trihydrocarbon boron compound wherein the hydrocarbon group is selected from the groups consisting of alkyl, cycloalkyl, and aryl radicals at a temperature above 50° C. in the presence of a liquid hydrocarbon selected from the group consisting of saturated and aromatic hydrocarbons which are essentially inert under the reaction conditions.

2. The process for producing sodium triethylborohydride which comprises reacting sodium hydride with triethylborane in the presence of hexane at the reflux temperature of the reaction mixture.

3. The process for producing a metal trialkyl boron hydride which comprises reacting a hydride of a metal selected from the group consisting of alkali metals having an atomic weight above 22, and alkaline earth metals with a trialkylborane at a temperature above 50° C. in the presence of a liquid hydrocarbon selected from the group consisting of saturated and aromatic hydrocarbons which are essentially inert under the reaction conditions.

4. The process of claim 3 wherein the reaction is conducted at a temperature between about 60 to 150° C. and said trialkylborane is employed in amount between about 10 to 50 percent by weight in excess.

References Cited in the file of this patent

UNITED STATES PATENTS 2,917,547    Williams _____ Dec. 15, 1959

OTHER REFERENCES

Brown et al.: "J. Amer. Chem. Soc.," vol. 75, pp. 192–5 (1953).